US011027716B2

(12) United States Patent
Lee

(10) Patent No.: US 11,027,716 B2
(45) Date of Patent: Jun. 8, 2021

(54) INTEGRATED SOLENOID VALVE AND BRAKE SYSTEM USING THE SAME

(71) Applicant: MANDO CORPORATION, Gyeonggi-do (KR)

(72) Inventor: Chung Jae Lee, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 115 days.

(21) Appl. No.: 16/181,312

(22) Filed: Nov. 5, 2018

(65) Prior Publication Data

US 2019/0135256 A1 May 9, 2019

(30) Foreign Application Priority Data

Nov. 6, 2017 (KR) .......................... 10-2017-0146583

(51) Int. Cl.
*B60T 13/68* (2006.01)
*F16K 31/06* (2006.01)
(Continued)

(52) U.S. Cl.
CPC ............ *B60T 13/686* (2013.01); *B60T 7/042* (2013.01); *B60T 8/363* (2013.01); *B60T 8/409* (2013.01);
(Continued)

(58) Field of Classification Search
CPC .... B60T 13/686; B60T 13/745; B60T 13/662; B60T 7/042; B60T 8/363; B60T 8/4081; B60T 8/409
See application file for complete search history.

(56) References Cited

U.S. PATENT DOCUMENTS

| 5,542,755 A * | 8/1996 | Staib ...................... B60T 8/363 |
| | | 303/119.2 |
| 5,795,038 A * | 8/1998 | Fuller ...................... B60T 8/36 |
| | | 303/119.2 |

(Continued)

FOREIGN PATENT DOCUMENTS

| JP | 5302827 | 10/2013 |
| JP | 2016-102563 | 6/2016 |

(Continued)

OTHER PUBLICATIONS

Office Action dated Jul. 1, 2019 for Korean Patent Application No. 10-2017-0146583 and its English machine translation by Google Translate.

(Continued)

*Primary Examiner* — Thomas J Williams
*Assistant Examiner* — James K Hsiao
(74) *Attorney, Agent, or Firm* — Ladas & Parry, LLP

(57) ABSTRACT

An integrated solenoid valve and a brake system using the same are disclosed. The integrated solenoid valve includes an armature, an elastic member, a magnet core, an orifice unit, a filter member, a lip seal, a bidirectional passage, and a unidirectional passage. The armature is disposed in a sleeve, moves upward and downward in an axial direction, and opens or closes an orifice of a seat disposed at a lower side thereof. The elastic member provides elastic force to the armature in a closing direction of the orifice. The magnet core provides drive force to the armature in a direction opposite to that of the elastic member. The orifice unit is coupled to a lower side of the seat, and includes not only a hollow hole communicating with the orifice of the seat but also a passage hole. The filter member prevents inflow of foreign materials. The lip seal is inserted between the orifice unit and the filter member, and includes an inclined protrusion. The bidirectional passage is opened or closed by the (Continued)

armature moving up and down. The unidirectional passage is formed to pass through the passage hole and an outer surface of the inclined protrusion.

14 Claims, 6 Drawing Sheets

(51) Int. Cl.
  *B60T 8/40* (2006.01)
  *B60T 8/36* (2006.01)
  *B60T 13/74* (2006.01)
  *B60T 7/04* (2006.01)
  *B60T 13/66* (2006.01)

(52) U.S. Cl.
  CPC .......... *B60T 8/4081* (2013.01); *B60T 13/662* (2013.01); *B60T 13/745* (2013.01); *F16K 31/0675* (2013.01); *B60T 2270/306* (2013.01)

(56) References Cited

U.S. PATENT DOCUMENTS

| | | | | |
|---|---|---|---|---|
| 5,803,556 | A * | 9/1998 | Weis | B60T 8/365 137/614.19 |
| 6,254,199 | B1 * | 7/2001 | Megerle | B60T 8/363 137/550 |
| 7,341,320 | B2 * | 3/2008 | Otsuka | B60T 8/3615 303/119.2 |
| 8,141,959 | B2 * | 3/2012 | Ota | B60T 8/3675 251/129.14 |
| 8,322,684 | B2 * | 12/2012 | Otsuka | B60T 8/363 251/129.15 |
| 9,090,236 | B2 * | 7/2015 | Fricke-Schmidt | B60T 8/3615 |
| 2004/0173519 | A1 * | 9/2004 | Knight | B60T 8/3615 210/429 |
| 2010/0308245 | A1 * | 12/2010 | Fink | B60T 8/3615 251/129.15 |
| 2011/0285197 | A1 * | 11/2011 | Ganzel | B60T 13/168 303/2 |
| 2013/0161545 | A1 * | 6/2013 | Leventhal | B60T 8/4872 251/129.15 |
| 2013/0312404 | A1 * | 11/2013 | Ganzel | F15B 15/00 60/533 |
| 2018/0362005 | A1 * | 12/2018 | Kwak | B60T 13/686 |

FOREIGN PATENT DOCUMENTS

| | | |
|---|---|---|
| KR | 10-2009-0037014 | 4/2009 |
| KR | 10-2011-0100401 | 9/2011 |
| KR | 10-1276072 | 6/2013 |

OTHER PUBLICATIONS

Office Action dated Apr. 1, 2019 for Korean Patent Application No. 10-2017-0146583 and its English translation by Global Dossier.

* cited by examiner

INTEGRATED SOLENOID VALVE AND BRAKE SYSTEM USING THE SAME

CROSS-REFERENCE TO RELATED APPLICATION

This application is based on and claims priority under 35 U.S.C. § 119 to Korean Patent Application No. 10-2017-0146583, filed on Nov. 6, 2017 in the Korean Intellectual Property Office, the disclosure of which is incorporated by reference in its entirety.

BACKGROUND

1. Field

Embodiments of the present disclosure relate to an integrated solenoid valve and an electronic brake system for generating braking force using an electrical signal corresponding to a displacement of a brake pedal.

2. Description of the Related Art

A hydraulic brake system for braking of a vehicle is essentially mounted to a vehicle, and various systems have recently been proposed to obtain stronger and more stable braking force. Examples of hydraulic brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Meanwhile, in order to drive or stop a brake system of the electronic stability control system (ESC), it is necessary for a predetermined amount of fluid to be applied to the electronic stability control system (ESC). In order to implement the ESC brake system, a plurality of electronically-controlled simulator valves may be mounted to a modulator block.

A simulator valve for use in the above-mentioned brake system generally includes a hollow valve housing, a hollow cylindrical sleeve, a valve seat, a magnetic core, and an armature. The hollow valve housing is inserted into a bore of a modulator block, and includes an inlet and an outlet through which fluid or oil communicates with the modulator block. The hollow cylindrical sleeve is inserted into an upper end of the valve housing, and is welded to the upper end of the valve housing. The valve seat is press-fitted into the valve housing, and includes an orifice therein. The magnetic core is welded to the sleeve located opposite to the hollow valve housing. The armature may be movably received in the sleeve.

CITED REFERENCE

Patent Document

Korean Patent Registration No. 10-1276072 B1 (Jun. 18, 2013)

SUMMARY

Therefore, it is an aspect of the present disclosure to provide an electronic brake system to efficiently operate as well as to be easily manufactured at low costs.

Additional aspects of the disclosure will be set forth in part in the description which follows and, in part, will be obvious from the description, or may be learned by practice of the disclosure.

In accordance with an aspect of the present disclosure, an integrated solenoid valve includes an armature, an elastic member, a magnet core, an orifice unit, a filter member, a lip seal, a bidirectional passage, and a unidirectional passage. The armature is disposed in a sleeve, moves upward and downward in an axial direction, and opens or closes an orifice of a seat disposed at a lower side thereof. The elastic member provides elastic force to the armature in a closing direction of the orifice. The magnet core provides drive force to the armature in a direction opposite to that of the elastic member. The orifice unit is coupled to a lower side of the seat, and includes not only a hollow hole communicating with the orifice of the seat but also a passage hole. The filter member prevents inflow of foreign materials. The lip seal is inserted between the orifice unit and the filter member, and includes an inclined protrusion. The bidirectional passage is opened or closed by the armature moving up and down. The unidirectional passage is formed to pass through the passage hole and an outer surface of the inclined protrusion.

The orifice unit may include a large-diameter part fastened to the filter member and a small-diameter part formed to contact the inclined protrusion of the lip seal, and may restrict movement of the lip seal together with the filter member.

The filter member may include a first filter located at a surface facing a first port to prevent inflow of foreign materials, and a second filter located at a surface facing a second port to prevent inflow of foreign materials.

The filter member may further include a support part formed to protrude outward from a lower side of the filter member in a manner that the support part is spaced apart from a modulator block by a predetermined distance and secures a passage.

In accordance with another aspect of the present disclosure, an integrated solenoid valve includes an armature disposed in a sleeve, and configured to move upward and downward in an axial direction, and open or close an orifice formed at a lower side thereof, an elastic member configured to provide elastic force to the armature in a closing direction of the orifice, a magnet core configured to provide drive force to the armature in a direction opposite to that of the elastic member, a seat configured to include a first passage, a second passage, and the orifice therein, a filter member configured to prevent inflow of foreign materials, a lip seal inserted among a modulator block, the seat, and the filter member, and configured to include an inclined protrusion, a bidirectional passage configured to be opened or closed by the armature moving up and down, and pass through the first passage and the orifice, and a unidirectional passage formed to pass through the second passage and an outer surface of the inclined protrusion.

The filter member may include a gap passage formed at a surface contacting the seat in a manner that the unidirectional passage passes through the gap passage.

In accordance with another aspect of the present disclosure, a brake system includes an integrated solenoid valve, a master cylinder provided with at least one cylinder chamber having a volume changeable according to operation of a pedal, a pedal simulator connected to the cylinder chamber, and configured to provide reaction force corresponding to a pedal effort of the pedal, a hydraulic-pressure supply device configured to provide hydraulic pressure to at least one of a first hydraulic circuit and a second hydraulic circuit, an electronic control unit (ECU) configured to operate the hydraulic-pressure supply device, and a circuit balance valve configured to control a difference in pressure between the first hydraulic circuit and the second hydraulic circuit. The integrated solenoid valve is installed in a hydraulic passage through which at least one pressure chamber of the hydraulic-pressure supply device is connected to the circuit balance valve.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
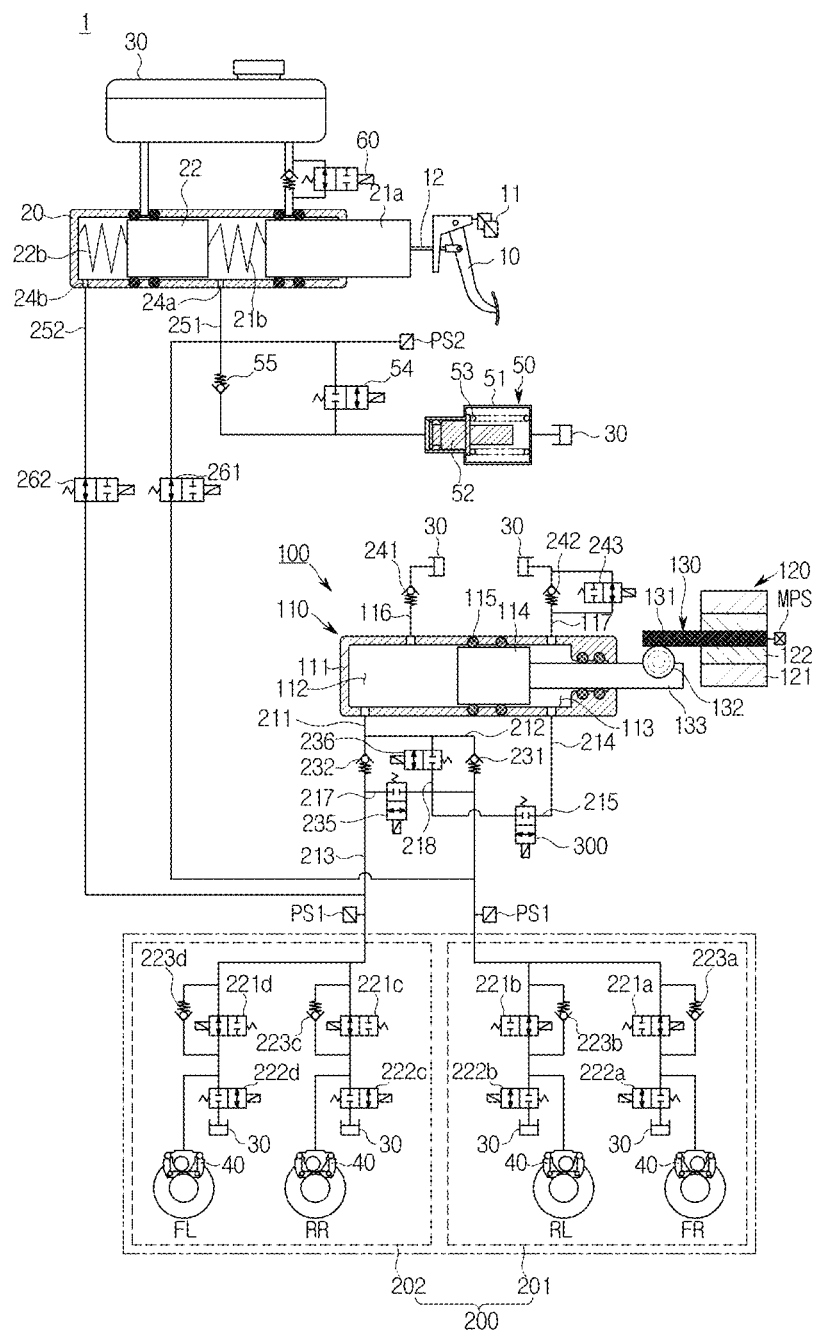
FIG. 1 is a hydraulic circuit diagram illustrating an integrated solenoid valve and an electronic brake system including the same according to a first embodiment of the present disclosure.

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

FIG. 1 is a hydraulic circuit diagram illustrating an integrated solenoid valve and an electronic brake system including the same according to a first embodiment of the present disclosure. Referring to FIG. 1, an electronic brake system 1 generally includes a master cylinder 20 to generate hydraulic pressure, a reservoir 30 coupled to an upper part of the master cylinder 20 to store oil, an input rod 12 to apply pressure to the master cylinder 20 according to a pedal effort of a brake pedal 10, one or more wheel cylinders 40 to perform braking of respective wheels RR, RL, FR, and FL when hydraulic pressure is transferred thereto, a pedal displacement sensor 11 to sense displacement of the brake pedal 10, and a pedal simulator 50 to provide reaction force corresponding to the pedal effort of the brake pedal 10.

The master cylinder 20 may be provided with at least one chamber to generate hydraulic pressure. For example, the master cylinder 20 may be provided with two cylinder chambers. From among the two cylinder chambers, one cylinder chamber may be provided to a front of a second piston 22a, and the other cylinder chamber may be disposed between a first piston 21a and the second piston 22a. The first piston 21a may be coupled to the input rod 12. The master cylinder 20 may include first and second hydraulic ports 24a and 24b through which hydraulic pressure is discharged outside from two cylinder chambers, respectively.

The master cylinder 20 provided with two cylinder chambers may be designed to secure safety in the event of malfunction. For example, one cylinder chamber from among the two cylinder chambers may be connected to the front right wheel FR and the rear left wheel RL of a vehicle, and the other cylinder chamber may be connected to the front left wheel FL and the rear right wheel RR. By configuring the two cylinder chambers to be independent of each other, braking of the vehicle remains possible even when one of the two cylinder chambers malfunctions.

Alternatively, differently from the drawings, one of the two cylinder chambers may be connected to two front wheels FR and FL, and the other cylinder chamber may be connected to two rear wheels RR and RL. One of the two cylinder chambers may be connected to the front left wheel FL and the rear left wheel RL, and the other cylinder chamber may be connected to the rear right wheel RR and the front right wheel FR. In other words, wheels connected to the cylinder chambers of the master cylinder 20 may be located at various positions.

A first spring 21b may be disposed between the first piston 21a and the second piston 22a of the master cylinder 20, and a second spring 22b may be disposed between the second piston 22a and one end of the master cylinder 20.

The first spring 21b may be contained in one of two cylinder chambers, and the second spring 22b may be contained in the other cylinder chamber. The first spring 21b and the second spring 22b may be compressed by the first piston 21a and the second piston 22a that move in response to change of displacement of the brake pedal 10, so that the first spring 21b and the second spring 22b may store elastic force generated by compression thereof. When force pushing the first piston 21a becomes weaker than the elastic force, the elastic force stored in the first and second springs 21b and 22b may push the first and second pistons 21a and 22a back to original positions thereof.

Meanwhile, the input rod 12 to pressurize the first piston 21a of the master cylinder 20 may closely contact the first piston 21a. Therefore, the brake pedal 10 may directly pressurize the master cylinder 20 without a pedal free stroke region, when the brake pedal 10 is depressed.

The pedal simulator 50 may be connected to a first backup passage 251 so as to provide reaction force corresponding to a pedal effort of the brake pedal 10. The simulation device 50 may provide reaction force to compensate for the pedal effort of the brake pedal 10 depressed by the driver, such that braking force can be precisely adjusted as intended by the driver.

Referring to FIG. 1, the pedal simulator 50 may include a simulation chamber 51 to store oil discharged from a first hydraulic port 24a of the master cylinder 20, a reaction force piston 52 provided in the simulation chamber 51, and a reaction force spring 53 elastically supporting the reaction force piston 52.

The reaction force piston 52 and the reaction force spring 53 may be installed to have a predetermined range of displacement within the simulation chamber 51 by oil flowing into the simulation chamber 51. A simulator valve 54 and a check valve 55 may be arranged parallel between the pedal simulator 50 and the reservoir 30.

The reaction force spring 53 is merely an example capable of supplying elastic force to the reaction force piston 52, and may be implemented as any of other examples capable of storing elastic force by shape deformation therein. For example, the reaction force spring 53 may be formed of a material such as rubber, or may include various members formed in a coil or plate shape to store elastic force therein.

Several reservoirs 30 may be shown in FIG. 1, and the respective reservoirs 30 may be denoted by the same reference number. However, the reservoirs 30 may be implemented as the same or different components. For example, the reservoir 30 connected to the pedal simulator 50 may be identical to the reservoir 30 connected to the master cylinder 20, or may store oil therein in a different way from the reservoir 30 connected to the master cylinder 20.

The pedal simulator 50 may operate as follows. If a pedal effort is applied to the brake pedal 10 by the driver of the vehicle, proper pedal feel for the driver may be formed during compression of the reaction force spring 53. In contrast, if the driver takes a foot off the brake pedal 10 to release the pedal effort applied to the brake pedal 10, the reaction force spring 53 pushes the reaction force piston 52 such that the reaction force piston 52 may move back to an original position thereof by elastic force of the reaction force spring 53. As described above, since the simulation chamber 51 is always filled with oil, frictional force of the reaction force piston 52 is minimized during operation of the pedal simulator 50, such that durability of the pedal simulator 50 can be improved and foreign materials from the outside can be prevented from flowing into the pedal simulator 50.

The electric brake system 1 according to the embodiment of the present disclosure may include a hydraulic-pressure supply device 100, a hydraulic control unit 200, a first cut valve 261, a second cut valve 262, and an electronic control unit (ECU) (not shown). The hydraulic-pressure supply device 100 may mechanically operate by receiving an electric signal indicating the driver's braking intention from the pedal displacement sensor 11 sensing displacement of the brake pedal 10. The hydraulic-pressure control unit 200 may include first and second hydraulic circuits 201 and 202, each of which includes two wheels (two of RR, RL, FR, FL) and controls flow of hydraulic pressure supplied to the wheel cylinder 40 disposed in the two wheels (two of RR, RL, FR, FL). The first cut valve 261 may be disposed in a first backup passage 251 configured to interconnect the first hydraulic port 24a and the first hydraulic circuit 201, and may control flow of hydraulic pressure. The second cut valve 262 may be disposed in a second backup passage 252 configured to interconnect the second hydraulic port 24b and the second hydraulic circuit 202, and may control flow of hydraulic pressure. The ECU may control the hydraulic-pressure supply device 100 and valves based on hydraulic pressure information and pedal displacement information.

The hydraulic-pressure supply device 100 may include a hydraulic-pressure providing unit 110 to provide oil pressure to be supplied to wheel cylinders 40, a motor 120 to produce rotational force according to an electrical signal from the pedal displacement sensor 11, and a power switching unit 130 to convert rotational motion of the motor 120 into rectilinear motion and to provide the rectilinear motion to the hydraulic-pressure providing unit 110. Alternatively, the hydraulic-pressure providing unit 110 may operate by pressure supplied from a high-pressure accumulator, instead of by driving force supplied from the motor 120.

The hydraulic-pressure providing unit 110 may include a cylinder block 111, a hydraulic piston 114, one or more sealing members 115, and a drive shaft 133. The cylinder block 111 may have a pressure chamber to store oil supplied thereto. The hydraulic piston 114 may be provided in the cylinder block 111. The sealing member 115 may be disposed between the hydraulic piston 114 and the cylinder block 111 to seal the pressure chamber. The drive shaft 133 may be connected to the rear end of the hydraulic piston 114 to transfer power from the power switching unit 130 to the hydraulic piston 114.

The pressure chamber may include a first pressure chamber 112 located at a front side (i.e., a forward direction, see a left side of FIG. 1) of the hydraulic piston 114, and a second pressure chamber 113 located at a rear side (i.e., a backward direction, see a right side of FIG. 1) of the hydraulic piston 114. That is, the first pressure chamber 112 may be divided by the cylinder block 111 and the front end of the hydraulic piston 114, and may have a volume changeable according to movement of the hydraulic piston 114. The second pressure chamber 113 may be divided by the cylinder block 111 and the rear end of hydraulic piston 114, and may have a volume changeable according to movement of the hydraulic piston 114.

The pressure chambers 112 and 113 may be connected to the first hydraulic passage 211 and the fourth hydraulic chamber 214, respectively. The first hydraulic passage 211 may connect the first pressure chamber 112 to the first and second hydraulic circuits 201 and 202. The first hydraulic passage 211 may be divided into a second hydraulic passage 212 communicating with the first hydraulic circuit 201 and a third hydraulic passage 213 communicating with the second hydraulic circuit 202. The fourth hydraulic passage 214 may connect the second pressure chamber 113 to the first and second hydraulic circuits 201 and 202. The fourth hydraulic passage 214 may be divided into a fifth hydraulic passage 215 communicating with the first hydraulic circuit 201 and a sixth hydraulic passage 216 communicating with the second hydraulic circuit 202.

The sealing member 115 may be disposed between the hydraulic piston 114 and the cylinder block 111 to seal a gap between the first pressure chamber 112 and the second pressure chamber 113. Hydraulic pressure or negative pressure of the first pressure chamber 112 affected by forward or backward movement of the hydraulic piston 114 may be blocked by the piston sealing member, so that the resultant hydraulic pressure or negative pressure of the first pressure chamber 112 can be transmitted to the first and fourth hydraulic passages 211 and 214 without leaking to the second pressure chamber 113.

The first pressure chamber 112 may be connected to the reservoir 30 through a first dump passage 116, such that the first pressure chamber 112 may receive oil from the reservoir 30 and store the received oil or may transmit oil of the first pressure chamber 112 to the reservoir 30. The second pressure chamber 113 may be connected to the reservoir 30 through a second dump passage 117, such that the second pressure chamber 113 may receive oil from the reservoir 30 and store the received oil or may transmit oil of the second pressure chamber 113 to the reservoir 30. For example, the dump passages 116 and 117 may include a first dump passage 116 that is branched from the first pressure chamber 112 and connected to the reservoir 30, and a second dump passage 117 that is branched from the second pressure chamber 113 and connected to the reservoir 30.

The second hydraulic passage 212 may communicate with the first hydraulic circuit 201, and the second hydraulic passage 213 may communicate with the second hydraulic circuit 202. Therefore, hydraulic pressure may be transmitted to the first and second hydraulic circuits 201 and 202 by forward movement of the hydraulic piston 114.

The electronic brake system 1 according to the embodiment of the present disclosure may include a first control valve 231 that is provided in the second hydraulic passage 212 to control flow of oil, and a second control valve 232 that is provided in the third hydraulic passage 213 to control flow of oil.

The first or second control valve 231 or 232 may be implemented as a check valve that allows oil to flow from the first pressure chamber 112 to the first or second hydraulic circuit 201 or 202 and prevents oil from flowing from the first or second hydraulic circuit 201 or 202 to the first pressure chamber 112. That is, the first or second control valve 231 or 232 may allow hydraulic pressure of the first pressure chamber 112 to flow into the first or second hydraulic circuit 201 or 202, and may prevent hydraulic pressure of the first or second hydraulic circuit 201 or 202 from leaking to the first pressure chamber 112 through the second or third hydraulic passage 212 or 213.

The fourth hydraulic passage 213 may be divided into the fifth hydraulic passage 215 and the sixth hydraulic passage 216 so that the fourth hydraulic passage 213 may communicate with both the first hydraulic circuit 201 and the second hydraulic circuit 202. For example, the fifth hydraulic passage 215 branched from the fourth hydraulic passage 214 may communicate with the first hydraulic circuit 201, and the sixth hydraulic passage 216 branched from the fourth hydraulic passage 214 may communicate with the second hydraulic circuit 202. Therefore, by backward movement of the hydraulic piston 114, hydraulic pressure may be transmitted to both the first hydraulic circuit 201 and the second hydraulic circuit 202.

The integrated solenoid valve 300 may be provided in the fifth hydraulic passage 215 to control flow of oil. The integrated solenoid valve 300 may be implemented as a control valve having a bidirectional flow passage and a unidirectional flow passage F to control flow of oil between the second pressure chamber 113 and either a circuit balance valve 235 or the first hydraulic circuit 201. The integrated solenoid valve 30 may be implemented as a normally closed (NC) solenoid valve that remains closed in a normal state and then opened upon receiving an opening signal from the ECU.

The unidirectional flow passage F may be provided in the integrated solenoid valve 300, and may be implemented as a check valve that allows oil to flow from the second pressure chamber 113 to the first hydraulic circuit 201 and prevents oil from flowing from the first hydraulic circuit 201 to the second pressure chamber 113. That is, the unidirectional flow passage F may prevent hydraulic pressure of the first hydraulic circuit 201 from leaking to the second pressure chamber 113 through the sixth hydraulic passage 216 and the fourth hydraulic passage 214.

The electronic brake system 1 may include a circuit balance valve 235 and a sixth control valve 236. The circuit balance valve 235 may be provided in a seventh hydraulic passage 217 to interconnect the second hydraulic passage 212 and the third hydraulic passage 213. The circuit balance valve 235 may adjust or regulate a pressure difference of the second hydraulic circuit 202. The sixth control valve 236 may be provided in an eighth hydraulic passage 218 interconnecting the second hydraulic passage 212 and the seventh hydraulic passage 217 so as to control flow of oil.

The circuit balance valve 235 and the sixth control valve 236 may be implemented as a normally closed (NC) solenoid valve that remains closed in a normal state and then opened upon receiving an opening signal from the ECU.

When the first control valve 231 or the second control valve 232 abnormally operates, the fifth control valve 235 and the sixth control valve 236 are opened such that hydraulic pressure of the first pressure chamber 112 can flow into the first hydraulic circuit 201 and the second hydraulic circuit 202.

The fifth control valve 235 and the sixth control valve 236 may be opened when hydraulic pressure of the wheel cylinder 40 flows into the first pressure chamber 112, because the first control valve 231 provided in the second hydraulic passage 212 and the second control valve provided in the third hydraulic passage 213 are implemented as check valves for allowing oil to flow only in one direction.

The electronic brake system 1 according to the embodiment of the present disclosure may include a first dump valve 241 provided in the first dump passage 116 to control flow of oil, and a second dump valve 242 provided in the second dump passage 117 to control flow of oil. The first dump valve 241 may be implemented as a check valve that allows oil to flow from the reservoir 30 to the first pressure chamber 112 and prevents oil from flowing from the first pressure chamber 112 to the reservoir 30. The second dump valve 242 may be implemented as a check valve that allows oil to flow from the reservoir 30 to the second pressure chamber 113 and prevents oil from flowing from the second pressure chamber 113 to the reservoir 30.

That is, the first dump valve 241 may be implemented as a check valve that allows oil to from the reservoir 30 to the first pressure chamber 112 and prevents oil from flowing from the first pressure chamber 112 to the reservoir 30. The second control valve 242 may be implemented as a check valve that allows oil to flow from the reservoir 30 to the second hydraulic circuit 113 and prevents oil from flowing from the second hydraulic circuit 113 to the reservoir 30.

The second dump passage 117 may include a bypass passage. A third dump passage 243 to control flow of oil between the second pressure chamber 113 and the reservoir 30 may be provided in the bypass passage.

The third dump valve 243 may be implemented as a bidirectional solenoid valve to control bidirectional flow of oil. The third dump valve 243 may be implemented as a normally opened (NO) solenoid valve that remains opened in a normal state and then closed upon receiving a closing signal from the ECU.

The hydraulic-pressure providing unit 110 may operate in a double-acting manner. That is, hydraulic pressure produced in the first pressure chamber 112 by forward movement of the hydraulic piston 114 may be transmitted to the first hydraulic circuit 201 through the first hydraulic passage 211 and the second hydraulic passage 212, thereby operating the wheel cylinders 40 installed in the front right wheel FR and the rear left wheel RL. In addition, hydraulic pressure produced in the first pressure chamber 112 by forward movement of the hydraulic piston 114 may be transmitted to the second hydraulic circuit 202 through the first hydraulic passage 211 and the third hydraulic passage 213, thereby operating the wheel cylinders 40 installed in the rear right wheel RR and the front left wheel FL.

Negative pressure produced in the first pressure chamber 112 by backward movement of the hydraulic piston 114 may suction oil from the wheel cylinders 40 installed in the front right wheel FR and the rear left wheel RL, and may transmit the suctioned oil to the first pressure chamber 112. In addition, the negative pressure produced in the first pressure chamber 112 by backward movement of the hydraulic piston 114 may suction oil from the wheel cylinder 40 installed in the rear right wheel RR and the front left wheel FL, and may transmit the suctioned oil to the first pressure chamber 112.

The motor 120 and the power switching unit 130 of the hydraulic-pressure supply device 100 will hereinafter be described.

The motor 120 may produce rotational force according to an output signal of the ECU (not shown), and may produce rotational force in a forward or backward direction. A rotational angular speed and a rotation angle of the motor 120 may be precisely controlled. The motor 120 is well known to those skilled in the art, and as such a detailed description thereof will herein be omitted for convenience of description.

The ECU may control the motor 120 and valves included in the electronic brake system 1 to be described later.

Driving force of the motor 120 may generate displacement of the hydraulic piston 114 through the power switching unit 130. Hydraulic pressure generated by the hydraulic piston 114 slidably moving within the pressure chamber may be transmitted to the wheel cylinders 40 respectively installed at the wheels RR, RL, FR, and FL through the first and second hydraulic passages 211 and 212.

The power switching unit 130 may convert rotational force into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU (not shown), and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure occurs in the first pressure chamber 112.

In contrast, when a pedal effort is removed from the brake pedal 10, the ECU may operate the motor 120 in an opposite direction so that the worm shaft 131 may also rotate in the opposite direction. Accordingly, the worm wheel 132 may also rotate in the opposite direction, and the hydraulic piston 114 connected to the drive shaft 133 moves back to the original position thereof (by backward movement), thereby generating negative pressure in the first pressure chamber 112. As described above, the hydraulic-pressure supply device 100 may transmit or suction hydraulic pressure to or from the wheel cylinders 40 according to a rotation direction of rotational force produced by the motor 120.

Meanwhile, when the motor 120 rotates in one direction, hydraulic pressure may occur in the first pressure chamber 112 or negative pressure may occur in the second pressure chamber 113. Information as to whether to brake the vehicle using hydraulic pressure or information as to whether to release braking using negative pressure may be determined by controlling solenoid valves.

The power switching unit 130 may also be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The hydraulic piston 114 may be connected to the ball nut of the power switching unit 130, and may pressurize the pressure chamber by rectilinear movement of the ball nut. The above-mentioned ball-screw-nut assembly to convert rotational force into rectilinear motion is well known to those skilled in the art, and as such a detailed description thereof will herein be omitted.

The electronic brake system 1 according to the embodiment of the present disclosure may further include a first backup passage 251 and a second backup passage 252, each of which is configured to directly transmit oil discharged from the master cylinder 20 to the wheel cylinders 40 during abnormal operation of the electronic brake system 1. The first backup passage 251 may be provided with the first cut valve 261 for controlling flow of oil, and the second backup passage 252 may be provided with the second cut valve 262 for controlling flow of oil. The first backup passage 251 may connect the first hydraulic port 24a to the first hydraulic circuit 201, and the second backup passage 252 may connect the second hydraulic port 24b to the second hydraulic circuit 202.

The first and second cut valves 261 and 262 may be implemented as normally opened (NO) solenoid valves that remain opened in a normal state and then closed upon receiving a closing signal from the ECU.

The hydraulic control unit 200 may include a first hydraulic circuit 201 to control two wheels upon receiving hydraulic pressure, and a second hydraulic circuit 202 to control the two other wheels upon receiving hydraulic pressure. For example, the first hydraulic circuit 201 may control the front right wheel FR and the rear left wheel RL. The second hydraulic circuit 202 may control the front left wheel FL and the rear right wheel RR. The wheel cylinders 40 may be respectively installed in the four wheels FR, FL, RR, and RL, such that the wheel cylinders 40 may receive hydraulic pressure from the hydraulic-pressure supply device 100, resulting in braking of the vehicle.

The first and second hydraulic circuits 201 and 202 may include a plurality of inlet valves 221 (221a, 221b, 221c, 221d) to control flow of hydraulic pressure. The first hydraulic circuit 201 may be provided with two inlet valves 221a and 221b connected to the first hydraulic passage 211 such that the two inlet valves 221a and 221b may respectively control hydraulic pressures applied to two wheel cylinders 40. The second hydraulic circuit 202 may be provided with two inlet valves 221c and 221d connected to the second hydraulic passage 212 such that the two inlet valves 221c and 221d may respectively control hydraulic pressures applied to the wheel cylinders 40.

In this case, the inlet valves 221 may be arranged upstream of the wheel cylinders 40. The inlet valves 221 may be implemented as normally opened (NO) solenoid valves that remain opened in a normal state and then closed upon receiving a closing signal from the ECU.

The first and second hydraulic circuits 201 and 202 may include check valves 223a, 223b, 223c, and 223d provided in bypass passages by which front ends and rear ends of the respective inlet valves 221a, 221b, 221c, and 221d are connected to each other. The check valves 223a, 223b, 223c, and 223d may allow oil to flow from the wheel cylinders 40 to the hydraulic-pressure providing unit 110 and prevents oil from flowing from the hydraulic-pressure providing unit 110 to the wheel cylinders 40. The check valves 223a, 223b, 223c, and 223d may allow brake pressure of the wheel cylinders 40 to be rapidly discharged. Alternatively, during abnormal operation of the inlet valves 221a, 221b, 221c, and 221d, the check valves 223a, 223b, 223c, and 223d may allow hydraulic pressure of the wheel cylinders 40 to flow into the hydraulic-pressure providing unit 110.

The first and second hydraulic circuits 201 and 202 may further include a plurality of outlet valves 222 (222a, 222b, 222c, 222d) connected to the reservoir 30 so as to improve performance or throughput when braking is released. The outlet valves 222 may be respectively connected to the wheel cylinders 40 so as to control hydraulic pressure discharged from the respective wheels RR, RL, FR, and FL. That is, the outlet valves 222 may sense brake pressures of the respective wheels RR, RL, FR, and FL. If decompression braking is needed, the outlet valves 222 may be selectively opened to control pressure.

The outlet valves 222 may be implemented as normally closed (NC) solenoid valves that remain closed in a normal state and then opened upon receiving an opening signal from the ECU.

The hydraulic control unit 200 may be connected to the backup passages 251 and 252. For example, the first hydraulic circuit 201 may be connected to the first backup passage 251 so as to receive hydraulic pressure from the master cylinder 20, and the second hydraulic circuit 202 may be connected to the second backup passage 252 so as to receive hydraulic pressure from the master cylinder 20.

The first backup passage 251 may be linked to the first hydraulic circuit 201 at upstream sides of the first and second inlet valves 221a and 221b. Likewise, the second backup passage 252 may be linked to the second hydraulic circuit 202 at upstream sides of the third and fourth inlet valves 221c and 221d. Therefore, hydraulic pressure supplied from the hydraulic-pressure providing unit 110 when the first and second cut valves 261 and 262 are closed may be supplied to the wheel cylinders 40 through the first and second hydraulic circuits 201 and 202. Hydraulic pressure supplied from the master cylinder 20 when the first and second cut valves 261 and 262 are opened may be supplied to the wheel cylinders 40 through the first and second backup passages 251 and 252. In this case, the plurality of inlet valves 221a, 221b, 221c, and 221d remain opened, so that operation states of the inlet valves 221a, 221b, 221c, and 221d need not be changed.

Meanwhile, reference numeral 'PS1' not illustrated is a hydraulic-passage pressure sensor to sense hydraulic pressure of the hydraulic circuit 201 or 202. Reference numeral 'PS2' not illustrated is a backup-passage pressure sensor to measure oil pressure of the master cylinder 20, and reference numeral 'MPS' not illustrated is a motor control sensor to control either a rotation angle of the motor 120 or a current of the motor 120.

Figure 2:
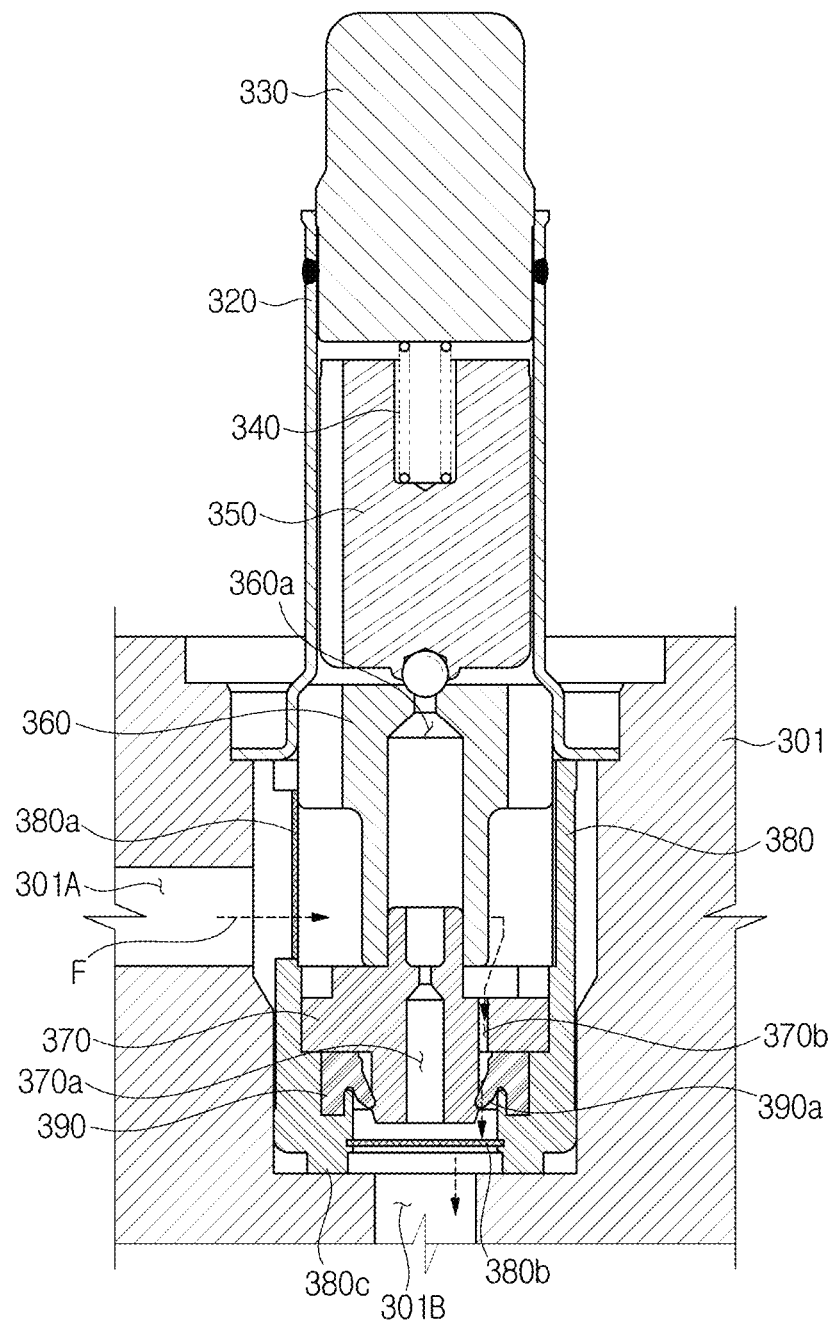
FIG. 2 is a side cross-sectional view illustrating an integrated solenoid valve according to a first embodiment of the present disclosure.
Figure 3A:
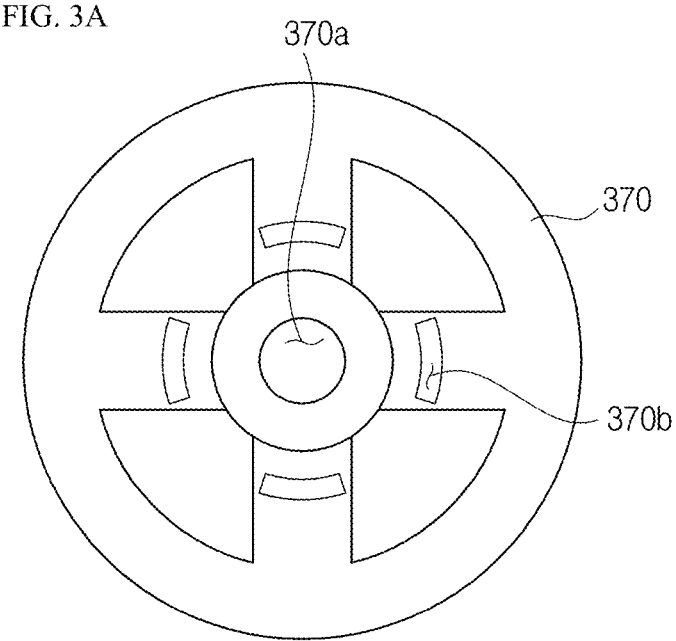
FIG. 3A is a plan view illustrating an orifice unit of an integrated solenoid valve according to a first embodiment of the present disclosure.
Figure 3B:
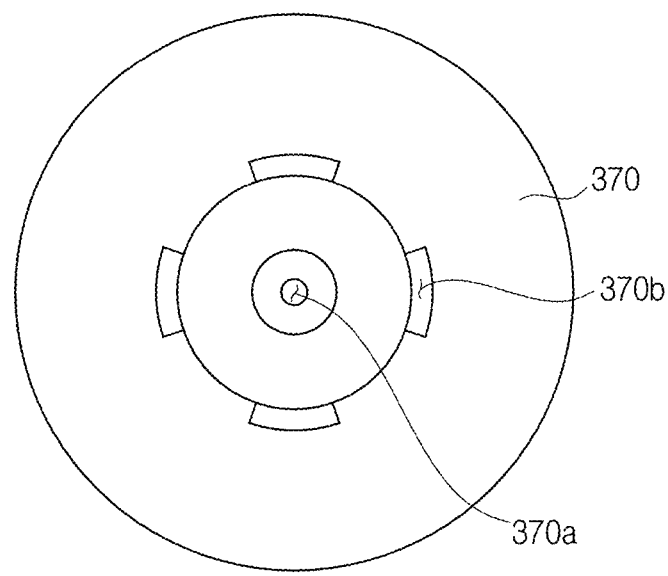
FIG. 3B is a bottom view illustrating an orifice unit of an integrated solenoid valve according to a first embodiment of the present disclosure.

FIG. 2 is a side cross-sectional view illustrating the integrated solenoid valve according to a first embodiment of the present disclosure. FIG. 3A is a plan view illustrating an orifice unit 370 of the integrated solenoid valve according to a first embodiment of the present disclosure, and FIG. 3B is a bottom view illustrating the orifice unit 370 of the integrated solenoid valve according to a first embodiment of the present disclosure.

The integrated solenoid valve 300 according to a first embodiment may include an armature 350, an elastic member 340, a magnet core 330, an orifice unit 370, a filter member 380, a lip seal 390, a bidirectional flow passage, and a unidirectional flow passage F. The armature 350 may be provided in a sleeve 320, may move upward and downward in the axial direction, and may open or close an orifice 360a of a seat 360 located at a lower side thereof. The elastic member 340 may provide elastic force to the armature 350 in the closing direction of the orifice 360a. The magnet core 330 may provide drive force to the armature 350 in the opposite direction to the direction of the elastic member 340. The orifice unit 370 may be coupled to a lower side of the seat 360, and may include not only a hollow hole 370a communicating with the orifice 360a of the seat 360, but also a passage hole 370b. The filter member 380 may prevent inflow of foreign materials. The lip seal 390 may be inserted between the orifice unit 370 and the filter member 380, and may include an inclined protrusion 390a. The bidirectional flow passage may be opened or closed by the armature 350 moving up and down. The unidirectional flow passage F may pass through the passage hole 370b and an outer surface of the inclined protrusion 390a.

The integrated solenoid valve 300 may open or close the orifice 360a using the armature 350 moving up and down by the magnet core 330, such that the integrated solenoid valve 300 may control the amount of fluid (or oil) flowing in the bidirectional flow passage designed to interconnect a first port 301A and a second port 301B. Here, the first port 301A may be provided in the vicinity of the pressure chambers 112 and 113, and the second port 301B may be provided in the vicinity of the circuit balance valve 235.

The integrated solenoid valve 300 may be embedded in a bore of a modulator block 301. The modulator block 301 may be formed as a rectangular block in which not only the simulator valve but also the above-mentioned constituent elements of the electronic brake system are embedded compactly and densely.

The sleeve 320 may be press-fitted into or welded to the integrated solenoid valve 300, and the magnet core 330 may be installed at an upper side of the sleeve 320. The sleeve 320 may accommodate the armature 350 therein, and may restrict horizontal movement of the armature 350 in a manner that the armature 350 can move upward and downward only in a longitudinal direction.

The magnet core 330 may be press-fitted into the upper side of the sleeve 320, such that the open upper end of the sleeve 320 is closed. A coupling groove may be formed in the magnet core 330, and the magnet core 330 may be pressed to allow the sleeve 320 to be caught in the coupling groove, such that the magnet core 330 and the sleeve 320 can be more closely and tightly coupled to each other. The above-mentioned coupling structure may facilitate coupling between the sleeve 320 and the magnet core 330 while simultaneously simplifying a coupling process, as compared to the welding coupling scheme.

The armature 350 may be installed to move upward and downward in the sleeve 320, and a ball may be coupled to a lower end of the armature 350 so that the armature 350 may be in contact with the seat 360 having the orifice 360a. An upper groove of the armature 350 may be arranged to face the magnet core 330, resulting in formation of a space in which the elastic member 340 is inserted to be described later.

One end of the elastic member 340 may be in contact with the upper groove of the armature 350, and the other end of the first elastic member 340 may be in contact with the magnet core 330. The first elastic member 340 may apply elastic force to the armature 350 so that the integrated solenoid valve 300 may remain closed in a normal state. When magnetic force does not occur in the magnet core 330 in a normal state, the armature 350 remains pressed downward by the first elastic member 340. When the magnet core 330 produces magnetic force, the armature 350 may move upward so that the bidirectional flow passage is opened through the orifice 360a.

The orifice unit 370 may include the hollow hole 370a to control the amount of fluid or oil, and may be press-fitted into the lower side of the seat 360. The opposite side of the seat 360 may include not only a large-diameter part corresponding to the size of an inner diameter of the filter member 370, but also an inner step difference corresponding to a small-diameter part needed for assembling the lip seal 390. The orifice unit 370 may be provided with the passage hole 370b needed for fluid flowing in the unidirectional flow passage F.

The lip seal 390 may be disposed between an inner surface of the filter member 370 and an outer surface of the orifice unit 370. The inclined protrusion 390a may be provided in the lip seal 390. The unidirectional flow passage F may be designed to pass not only through the passage hole 370b provided in the orifice unit 370, but also through the inclined protrusion 390a.

The lip seal 390 may be contained in the filter member 370 in a manner that the inclined protrusion 390a is in contact with the outer circumference of the small-diameter part of the orifice unit 370, and may include the inclined protrusion 390a that is deformed by a pressure difference and slantingly protrudes inward, such that the lip seal 390 may allow fluid or oil to flow only in one direction.

When pressure of the first port 301A is higher than pressure of the second port 301B, the inclined protrusion 390a is curved in a gap-reducing direction, such that the unidirectional flow passage F is formed. In contrast, when pressure of the second port 301B is lower than pressure of the first port 301A, the inclined protrusion 390a is curved in a gap-increasing direction, such that the unidirectional flow passage F is not formed.

The filter member 380 may include a first filter 380a, a second filter 380b, and a support part 380c. The first filter 380a may be provided at the surface facing the first port 301A to prevent inflow of foreign materials. The second filter 380b may be provided at the surface facing the second port 301B to prevent inflow of foreign materials. The support part 380c may protrude outward from a lower side thereof in a manner that the support part 380c is spaced apart from the modulator block 301 by a predetermined distance and secures a passage. The filter member 380 may be assembled with the lower part of the orifice unit 370, and may restrict movement of the lip seal 390 together with the orifice unit 370, such that movement of the lip seal 390 can be restricted in a pressurization mode.

Figure 4:
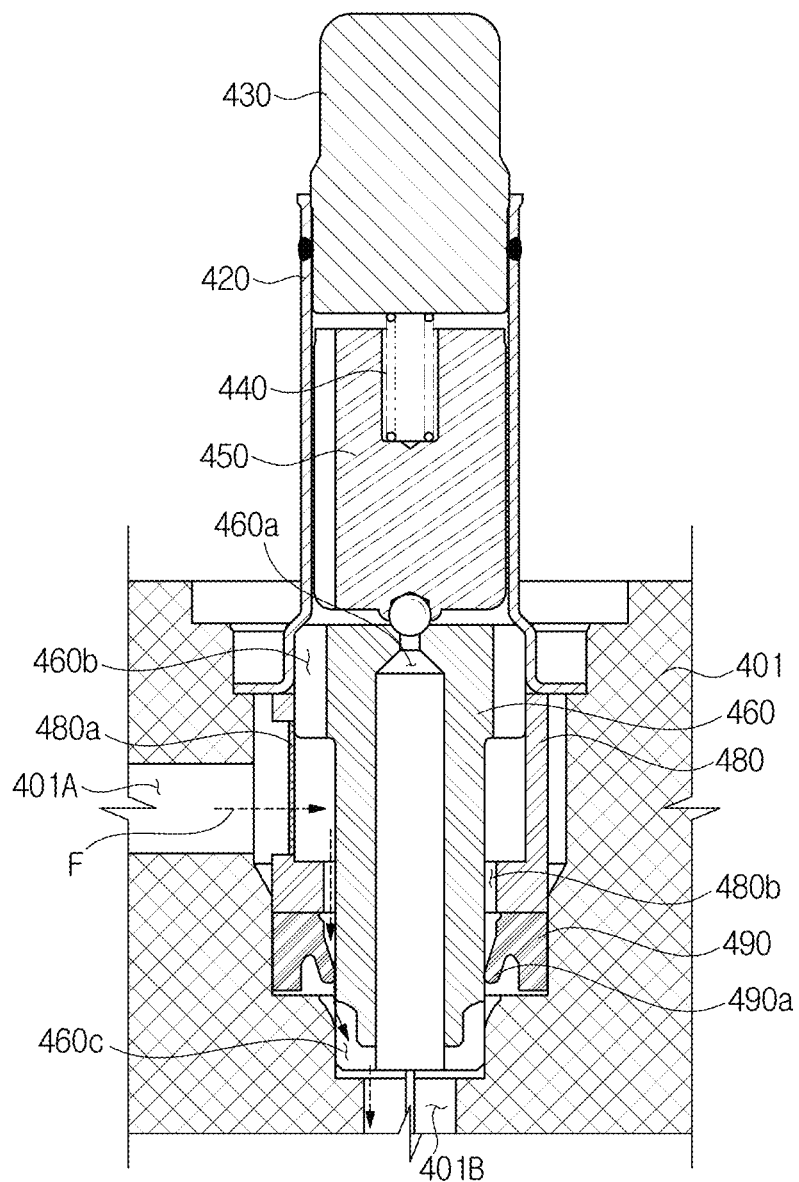
FIG. 4 is a side cross-sectional view illustrating an integrated solenoid valve according to a second embodiment of the present disclosure.
Figure 5A:
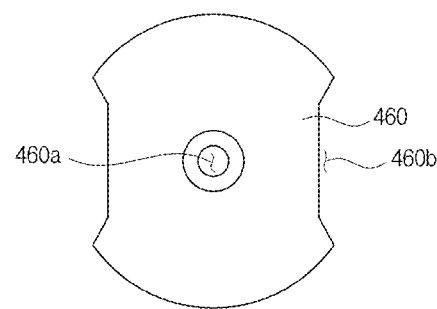
FIG. 5A is a top view illustrating an integrated solenoid valve according to a second embodiment of the present disclosure.
Figure 5B:
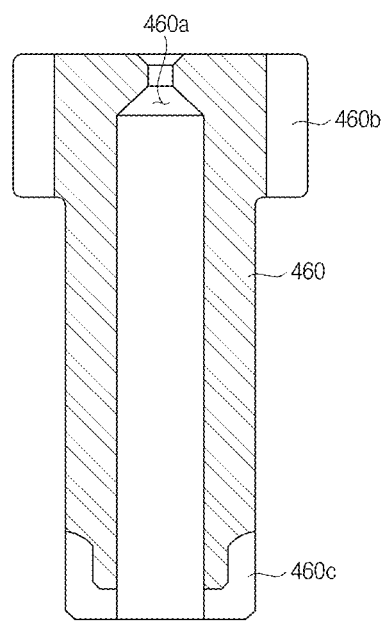
FIG. 5B is a side cross-sectional view illustrating an integrated solenoid valve according to a second embodiment of the present disclosure.
Figure 5C:
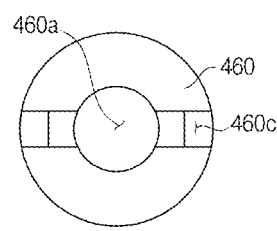
FIG. 5C is a bottom view illustrating an integrated solenoid valve according to a second embodiment of the present disclosure.
Figure 6A:
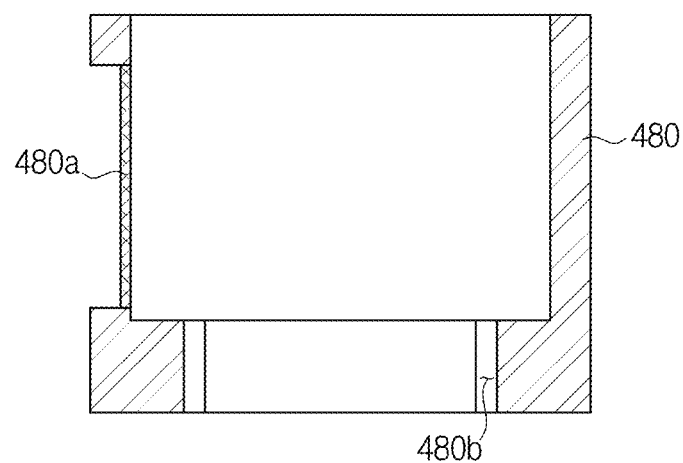
FIG. 6A is a side cross-sectional view illustrating a filter member of an integrated solenoid valve according to a second embodiment of the present disclosure.
Figure 6B:
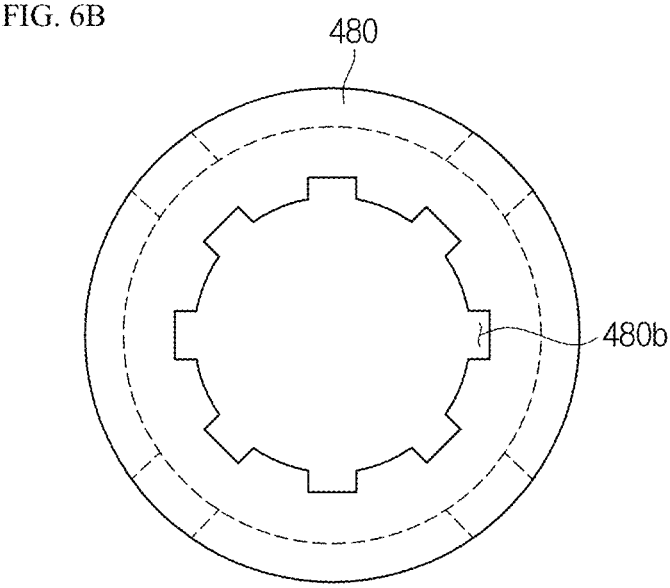
FIG. 6B is a bottom view illustrating a filter member of an integrated solenoid valve according to a second embodiment of the present disclosure.

FIG. 4 is a side cross-sectional view illustrating an integrated solenoid valve 400 according to a second embodiment of the present disclosure. FIG. 5A is a top view illustrating a seat 460 according to a second embodiment of the present disclosure, FIG. 5B is a side cross-sectional view illustrating the seat 460 according to a second embodiment of the present disclosure, and FIG. 5C is a bottom view illustrating the seat 460 according to a second embodiment of the present disclosure. FIG. 6A is a side cross-sectional view illustrating a filter member 480 according to a second embodiment of the present disclosure, and FIG. 6B is a bottom view illustrating the filter member 480 according to a second embodiment of the present disclosure.

Referring to FIGS. 4 to 6, the integrated solenoid valve 400 of the second embodiment may be replaced with the integrated solenoid valve 300 of the first embodiment. The integrated solenoid valve 400 of the second embodiment may be designed to control the amount of fluid or oil that flows in the passage interconnecting a first port 401A and a second port 402A provided in the modulator block 401. In this case, the first port 401A communicates with the pressure chambers 112 and 113 of the hydraulic-pressure providing device 100, and the second port 401B is connected to the circuit balance valve 235, such that the integrated solenoid valve 400 may control fluid flowing between the circuit balance valve 235 and the pressure chamber 112 or 113.

The integrated solenoid valve 400 may include an armature 450, an elastic member 440, a magnet core 430, a seat 460, a lip seal 490, a bidirectional flow passage, and a unidirectional flow passage F. The armature 450 may be provided in a sleeve 420, may move upward and downward in the axial direction, and may open or close an orifice 460a of a seat 460 located at a lower side thereof. The elastic member 440 may provide elastic force to the armature 450 in the closing direction of the orifice 460a. The magnet core 430 may provide drive force to the armature 450 in the opposite direction to the direction of the elastic member 440. The seat 460 may include a first passage 460b, a second passage 460c, and an orifice 460a. The lip seal 490 may be inserted between a modulator block 401 and the seat 460, and may include an inclined protrusion 490a such that fluid or oil can flow only in one direction. The bidirectional flow passage may be opened or closed by the armature 450 moving up and down, and may pass through the first passage 460b. The unidirectional flow passage F may pass through the second passage 460c and an outer surface of the inclined protrusion 490a.

The seat 460 may include an orifice 460a, a first passage 460b, and a second passage 460c. The orifice 460a may be provided at the surface contacting a ball of the armature 450. The first passage 460b may be concaved at both ends of an upper side of the seat 460. The second passage 460c may be formed stepwise at a specific position where the second passage 460c is in contact with the modulator block 401 located at both ends of a lower part of the seat 460.

The filter member 480 may include one or more gap passages 480b that are spaced apart from each other by a predetermined distance at the surface contacting the seat 460 in a manner that the unidirectional passage F can pass through the one or more gap passages 480b. That is, the unidirectional passage F may pass through the outer surface of the inclined protrusion 490a and the second passage 460c after passing through the first port 401A and the gap passage 480b, such that the unidirectional passage F may act as a check valve that allows fluid or oil to flow only in one direction toward the second port 401B and prevents fluid or oil from flowing in the opposite direction to the one direction.

As is apparent from the above description, the electronic brake system according to the embodiments of the present disclosure may efficiently operate using an integrated solenoid valve provided with a check valve function, need not include a check valve therein, and may thus be easily manufactured at low costs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An integrated solenoid valve comprising:
   an armature disposed in a sleeve, and configured to move upward and downward in an axial direction, and open or close an orifice of a seat disposed at a lower side thereof;
   an elastic member configured to provide elastic force to the armature in a closing direction of the orifice;
   a magnet core configured to provide drive force to the armature in a direction opposite to that of the elastic member;
   an orifice unit coupled to a lower side of the seat, and configured to include not only a hollow hole communicating with the orifice of the seat but also a passage hole;
   a filter member configured to prevent inflow of foreign materials;
   a lip seal inserted between the orifice unit and the filter member, and configured to include an inclined protrusion, wherein the lip seal is positioned to directly contact the filter member;
   a bidirectional passage opened or closed by the armature moving up and down;
   a unidirectional passage formed to pass through the passage hole and an outer surface of the inclined protrusion.

2. The integrated solenoid valve according to claim 1, wherein the orifice unit includes a large-diameter part fastened to the filter member and a small-diameter part formed to contact the inclined protrusion of the lip seal, and restricts movement of the lip seal together with the filter member.

3. The integrated solenoid valve according to claim 2, wherein the filter member includes:
   a first filter located at a surface facing a first port to prevent inflow of foreign materials; and
   a second filter located at a surface facing a second port to prevent inflow of foreign materials.

4. The integrated solenoid valve according to claim 3, wherein the filter member further includes:
   a support part formed to protrude outward from a lower side of the filter member in a manner that the support part is spaced apart from a modulator block by a predetermined distance and secures a passage.

5. A brake system comprising:
   an integrated solenoid valve according to claim 1;
   a master cylinder provided with at least one cylinder chamber having a volume changeable according to operation of a pedal; a pedal simulator connected to the cylinder chamber, and configured to provide reaction force corresponding to a pedal effort of the pedal;
   a hydraulic-pressure supply device configured to provide hydraulic pressure to at least one of a first hydraulic circuit and a second hydraulic circuit;
   an electronic control unit (ECU) configured to operate the hydraulic-pressure supply device; and
   a circuit balance valve configured to control a difference in pressure between the first hydraulic circuit and the second hydraulic circuit,
   wherein the integrated solenoid valve is installed in a hydraulic passage through which at least one pressure chamber of the hydraulic-pressure supply device is connected to the circuit balance valve.

6. The integrated solenoid valve according to claim 1, wherein the lip seal is disposed inside the filter member.

7. An integrated solenoid valve controlling an amount of fluid in a flow passage connecting a first port and a second port, the integrated solenoid valve comprising:
   an armature disposed in a sleeve, and configured to move upward and downward in an axial direction, and open or close an orifice formed at a lower side thereof;
   an elastic member configured to provide elastic force to the armature in a closing direction of the orifice;
   a magnet core configured to provide drive force to the armature in a direction opposite to that of the elastic member;
   a seat configured to include a first passage, a second passage, and the orifice therein;
   a filter member positioned outside the seat to prevent inflow of foreign materials, the filter member comprising a gap passage formed by a dent formed on an inner surface of the filter member contacting the seat along the axial direction;
   a lip seal inserted among a modulator block, the seat, and the filter member, and configured to include an inclined protrusion inclined toward the seat;
   a bidirectional passage configured to be opened or closed by the armature moving up and down, and pass through the first passage and the orifice; and
   a unidirectional passage formed to pass through the gap passage, the inclined protrusion and the second passage in order.

8. A brake system comprising:
   an integrated solenoid valve according to claim 7;
   a master cylinder provided with at least one cylinder chamber having a volume changeable according to operation of a pedal;
   a pedal simulator connected to the cylinder chamber, and configured to provide reaction force corresponding to a pedal effort of the pedal;
   a hydraulic-pressure supply device configured to provide hydraulic pressure to at least one of a first hydraulic circuit and a second hydraulic circuit;
   an electronic control unit (ECU) configured to operate the hydraulic-pressure supply device; and
   a circuit balance valve configured to control a difference in pressure between the first hydraulic circuit and the second hydraulic circuit,
   wherein the integrated solenoid valve is installed in a hydraulic passage through which at least one pressure chamber of the hydraulic-pressure supply device is connected to the circuit balance valve.

9. The integrated solenoid valve of claim 7, wherein the gap passage is positioned at a portion of the filter member closer to the second passage.

10. The integrated solenoid valve of claim 9, wherein:
    the first passage is positioned at a portion of the seat closer to the armature,
    the second passage is positioned at another portion of the seat closer to the second port, and
    the orifice is formed to pass through an inside of the seat along the axial direction.

11. The integrated solenoid valve of claim 10, wherein the armature comprises a ball contacting the orifice.

12. The integrated solenoid valve of claim 9, wherein the gap passage is formed as a plurality of passages spaced apart from each other at an inner surface of the filter member.

13. The integrated solenoid valve of claim 7, wherein:
 the lip seal is positioned between an outer surface of the seat and the modulator block, and
 the inclined protrusion is positioned on an inner surface of the lip seal and contacts the outer surface of the seat.

14. The integrated solenoid valve of claim 13, wherein:
 the inclined protrusion is configured to be deformed by a pressure of the fluid, allow to flow the fluid in one direction by being deformed in a gap-reducing direction when a pressure of the first port is greater than a pressure of the second port, and prevent to flow the fluid in the one direction by being deformed in a gap-increasing direction when the pressure of the first port is less than the pressure of the second port.

* * * * *